United States Patent
Hozumi

(10) Patent No.: US 6,608,799 B2
(45) Date of Patent: Aug. 19, 2003

(54) MAGNETO-OPTICAL REPRODUCTION APPARATUS WITH DETECTING OF DISPLACEMENT OF DOMAIN WALL OF RECORDING DOMAIN

(75) Inventor: Yasushi Hozumi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/839,307

(22) Filed: Apr. 23, 2001

(65) Prior Publication Data

US 2001/0046189 A1 Nov. 29, 2001

(30) Foreign Application Priority Data

Apr. 25, 2000 (JP) .......................................... 2000-124517

(51) Int. Cl.$^7$ .............................................. G11B 11/00
(52) U.S. Cl. .................................................... 369/13.26
(58) Field of Search ........................... 369/13.26, 13.24, 369/13.28, 13.29, 13.53, 275.2, 275.1, 44.73

(56) References Cited

U.S. PATENT DOCUMENTS

| | | | |
|---|---|---|---|
| 5,168,482 A | | 12/1992 | Aratani et al. ................. 369/13 |
| 5,481,530 A | * | 1/1996 | Ueda et al. ............... 369/275.1 |
| 5,541,900 A | * | 7/1996 | Ito et al. ................... 369/44.31 |
| 5,616,428 A | | 4/1997 | Nishimura et al. ......... 428/694 |
| 5,953,289 A | * | 9/1999 | Miyaoka ....................... 369/13 |
| 5,995,472 A | * | 11/1999 | Fujii et al. .................. 369/110 |
| 6,027,825 A | | 2/2000 | Shiratori et al. ............. 428/694 |
| 6,069,852 A | * | 5/2000 | Miyaoka et al. ............... 369/13 |
| 6,147,939 A | * | 11/2000 | Takahashi et al. ............. 369/13 |
| 6,338,911 B1 | * | 1/2002 | Mori et al. ............... 369/13.38 |
| 6,345,016 B1 | * | 2/2002 | Shiratori ................... 369/13.54 |

FOREIGN PATENT DOCUMENTS

| | | |
|---|---|---|
| JP | 3-93058 | 4/1991 |
| JP | 6-124500 | 5/1994 |
| JP | 6-290496 | 10/1994 |

* cited by examiner

*Primary Examiner*—Tan Dinh
(74) *Attorney, Agent, or Firm*—Fitzpatrick, Cella, Harper & Scinto

(57) ABSTRACT

Recorded information is reproduced based on the displacement of a domain wall using an optical system having a reproducing optical beam with the beam waist diameter thereof satisfying a condition of $2W_o < 900$ nm. A sharp temperature distribution is formed in the recording medium, and the speed of displacement of the magnetic wall is increased. Even when a disk rotational speed is increased, a reliable domain wall displacement reproduction is thus accomplished.

6 Claims, 3 Drawing Sheets

MAGNETO-OPTICAL REPRODUCTION APPARATUS WITH DETECTING OF DISPLACEMENT OF DOMAIN WALL OF RECORDING DOMAIN

BACKGROUND OF THE INVENTION

1. Field of the Invention

The present invention relates to a magnetooptical reproduction apparatus and method for reproducing information recorded in a magnetooptical recording medium and, in particular, to a magnetooptical reproduction apparatus and method for reproducing recorded information using a domain wall displacement detection technique.

2. Description of the Related Art

The linear recording density of an optical disk is largely dependent on the laser wavelength of a reproducing optical system used to reproduce/pick-up information recorded on a magnetooptical recording medium, and the numerical aperture of an objective lens used in the optical system. A beam waist diameter $2W_o$ is determined by the laser wavelength $\lambda$ of the reproducing optical system and the numerical aperture NA of the objective lens; thus, the relationship of $2W_o = K \cdot \lambda/NA$ holds, where $\lambda/NA$ and K are constants determined by the aperture of the lens and the intensity distribution of an incident luminous flux. Spatial frequency during a signal detection is subject to a limitation of $2NA/\lambda$.

Optical disks having a higher storage capacity are highly desired. Efforts to increase storage capacity and improve information reproduction by improving control of the laser wavelength $\lambda$ and the numerical aperture NA face a limitation in an attempt to achieve a high-density recording in optical disks in excess of the diffraction limit determined by the wavelength $\lambda$ and the numerical aperture NA of the conventional optical disk. Conventional techniques for improving the recording density of the optical disk have been developed by improving the structure of the recording medium and the method of reading out information from the recording medium.

For example, Japanese Patent Laid-Open No. 3-93058 and Japanese Patent Laid-Open No. 6-124500 disclose a signal reproduction method. In this disclosure, a signal is recorded on a multilayer recording medium formed of magnetically coupled reproducing and recording layers. The reproducing layer is irradiated with a laser beam that raises the temperature in a localized area of the laser beam after aligning the magnetization direction of the reproducing layer. An information (data) signal digitally recorded as a series of magnetic domains in the recording layer serially is transferred to the localized area having a raised temperature in the reproducing layer and is read out at the same time. This method limits, to a tiny area relative to a reproducing laser spot diameter, an aperture which is heated by the laser beam so at to reach a transfer temperature sufficient for a signal to be detected therefrom. This disclosed technique reduces inter-code interference during reproduction, and reproduces a signal having a bit period shorter than the optical detection limit $\lambda/2NA$.

This type of reproduction method is called an MSR (magnetically induced superresolution) readout method. Since the MSR reproduction method has an effective signal detection area smaller than the reproducing laser spot diameter, the amplitude of a reproduction signal disadvantageously gets smaller.

Japanese Patent Laid-Open No. 6-290496 discloses another reproduction method. In this disclosure, a domain wall present in the border of a magnetic domain (recording mark) is displaced toward a higher-temperature direction due to a wall energy gradient, and a high-density recorded signal is reproduced by detecting the displacement of the domain wall. In this method, the domain wall moves at the moment the domain wall is heated to a temperature at which the domain wall becomes movable. The high-density recorded signal is reproduced by detecting the displacement of the domain wall. The signal reproduction is possible without regard to the optical diffraction limit. This type of reproduction method is called a DWDD (domain wall displacement detection) method.

Theoretically, the DWDD method is independent of the length of a recording mark. The recording medium itself moves with respect to a reproducing light beam spot and the speed of the domain wall displacement is definite. A linear velocity or a mark length, practically reproducible, is subject to a limitation. Specifically, when a signal recorded on DWDD medium is reproduced using a conventional optical system (for example, under the conditions of $\lambda = 680$ nm, and NA=0.55), the rotational speed of the medium must be slowed to 2 m/s or lower to perform a DWDD reproduction which stably reproduces a signal with a miniature recording mark having a mark length of 0.1 $\mu$m or shorter. The conventional DWDD reproduction method cannot speed up the data transfer rate.

SUMMARY OF THE INVENTION

Accordingly, it is an object of the present invention to provide a magnetooptical reproducing apparatus that implements an improved DWDD reproduction method, achieving a fast data transfer rate.

In one aspect, the present invention relates to a magnetooptical reproducing apparatus that reproduces information recorded on a magnetooptical recording medium by moving a domain wall of a recording domain of the magnetooptical recording medium in accordance with a temperature distribution formed in the magnetooptical recording medium. The magnetooptical reproducing apparatus includes an optical system that directs an optical beam to the recording medium to form a localized temperature distribution in the magnetooptical recording medium, a drive mechanism that moves the optical beam and the recording medium relative to one another, and a reproducing circuit that generates a reproduction signal in response to detected variation in the optical beam reflected from the recording medium, wherein the optical system satisfies a condition of $2W_o < 900$ nm, where $2W_o$ is a beam waist diameter of the optical beam.

In another aspect, the present invention relates to a magnetooptical reproducing method for reproducing information recorded on a magnetooptical recording medium by detecting movement of a domain wall of a recording domain of the manetooptical recording medium caused to move in accordance with a temperature distribution formed in the magnetooptical recording medium. The magnetooptical reproducing method includes a step of directing an optical beam to the magnetooptical recording medium to form the temperature distribution in the magnetooptical recording medium, where the optical beam has a beam waist diameter of $2W_o < 900$ nm, a step of moving the optical beam and the recording medium relative to one another, a step of detecting an optical beam reflected from the recording medium, and a step of forming a reproduction signal in response to the result of the detecting step according to data recorded on the magnetooptical recording medium.

Further objects, features, and advantages of the present invention will be apparent from the following description of the preferred embodiments with reference to the attached drawings.

DESCRIPTION OF THE PREFERRED EMBODIMENTS

Figure 1:
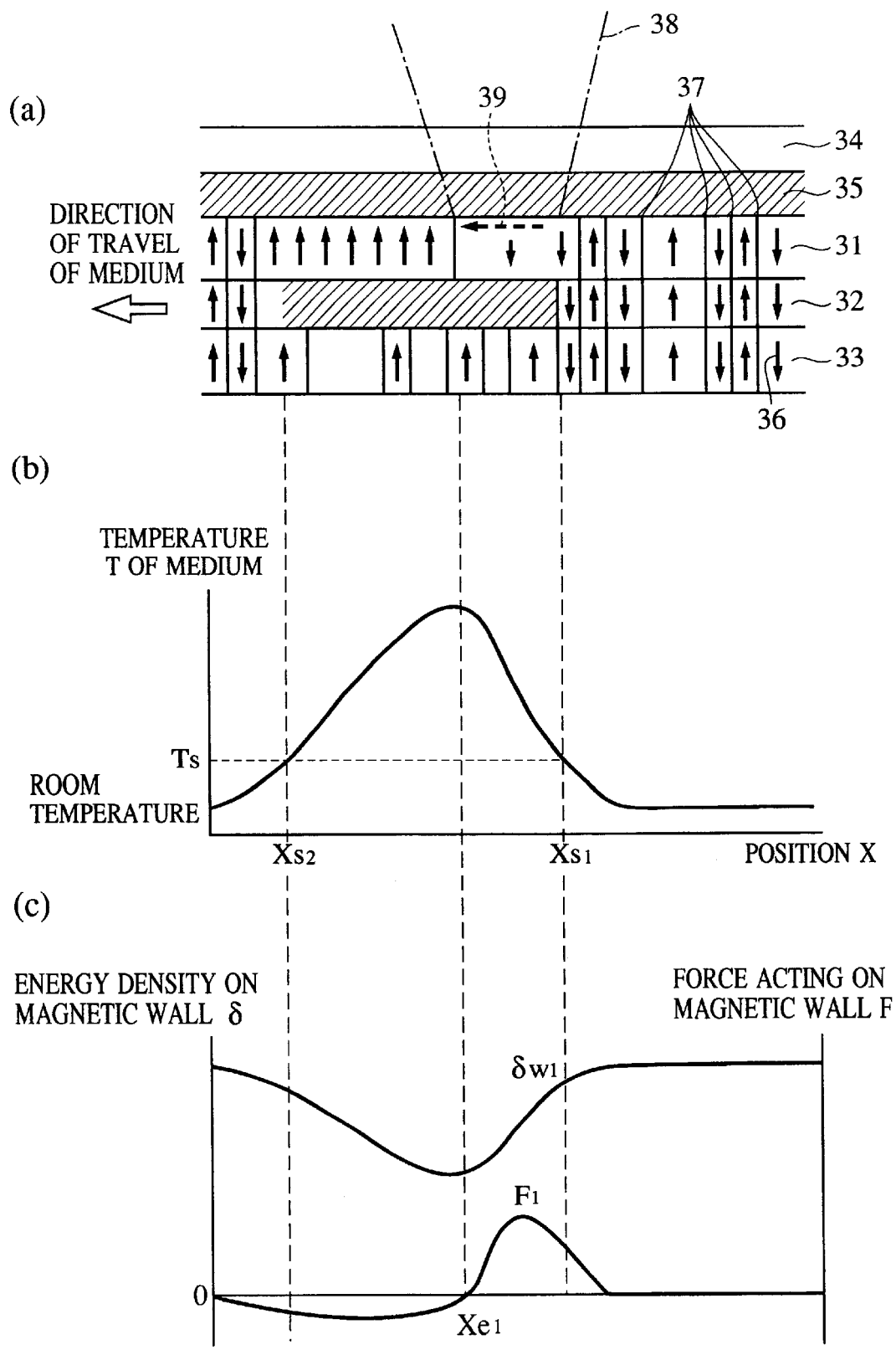
FIG. 1, including (a), (b), and (c), illustrates the principle of a domain wall displacement detection reproduction method.

The embodiments of the present invention are now discussed in detail referring to the drawings. The magnetooptical reproducing apparatus of this invention reproduces information which is recorded on a magnetooptical recording medium using the domain wall displacement detection (DWDD) reproduction method disclosed in Japanese Patent Laid-Open No. 6-290496. The principle of the DWDD reproduction method is discussed before the discussion of the embodiments of the present invention.

FIG. 1(a) is a cross-sectional view of a magnetooptical recording medium used in the DWDD reproduction method. The recording medium is produced by successively laminating, on a transparent substrate 34, a light transmissive layer 35, a first magnetic layer (displacement layer) 31, a second magnetic layer (switching layer) 32, and a third magnetic layer (memory layer) 33. The recording medium has a three-layer structure in this embodiment. Arrows 36 represent the direction of spin (magnetic domain) in each layer. Domain walls 37 are formed at borders where the spin directions are opposed to each other. FIG. 1(b) is a graph showing the temperature distribution formed in the magnetooptical recording medium. The temperature distribution is created in the recording medium by a reproducing light beam spot 38. At positions Xs1 and Xs2, the medium temperature is Ts in the vicinity of the Curie temperature of the second magnetic layer 32, where exchange coupling between the first magnetic layer 31 and the third magnetic layer 33 disappears.

FIG. 1(c) is a graph showing a distribution of domain wall energy density bw1 of the first magnetic layer 31 in response to the temperature distribution shown in FIG. 1(b). If there is a domain wall energy density gradient of $\delta w1$ in the x direction, a force F1 determined by the following equation acts on the domain wall of the first magnetic layer 31 in position x.

$$F1 = \partial \delta w1 / \partial x$$

The force F1 works in a manner to displace the domain wall to the side (direction) of low domain wall energy. A force Fs also acts on the domain wall to keep the domain wall stationary. The force Fs is expressed by the following equation.

$$Fs = 2\pi Ms1 \times Hw1$$

where Ms1 is the saturation magnetization of the first magnetic layer 31 and Hw1 is the coercive force of the first magnetic layer 31.

If the force Fs is sufficiently small with the temperature of the recording medium being Ts or higher, the domain wall is easily displaced by the force F1. On the other hand, in the regions in front of the position Xs1 (on the right of the position Xs1 in FIG. 1), and behind the position Xs2, the medium temperature is lower than Ts, the first magnetic layer 31 is exchange-coupled with the third magnetic layer 33 having a larger domain wall coercive force. The domain wall of the first magnetic layer 31 is pinned to a position corresponding to the domain wall of the third magnetic layer 33. The domain walls of the first magnetic layer 31 remain almost stationary.

In the DWDD reproduction method, a domain wall 37 is present at position Xs1 as shown in FIG. 1(a). When the recording medium rises in temperature to the temperature Ts in the vicinity of the Curie temperature of the second magnetic layer 32, the exchange coupling between the first magnetic layer 31 and the third magnetic layer 33 disappears. As represented by an arrow-headed broken line, the domain wall 37 of the first magnetic layer 31 moves at a high speed toward a tiny region Xe1 which is high in temperature and low in energy density. At the moment the edge of a recording mark recorded by a magnetization reversal in the recording medium crosses the position Xs1 as the recording medium moves, the recording mark quickly expands within the reproducing light beam spot. As a result, a sharp reproduced signal with a short rising edge and a short falling edge results.

The data transfer rate in the DWDD reproduction method is greatly dependent on the displacement speed of the domain wall. To achieve a high data transfer rate, the linear velocity of the disk medium must be increased. At least, the speed of the displacement of the domain wall must be greater than the linear velocity of the disk to perform the DWDD reproduction in a stable output waveform. Particularly when a miniature magnetic domain in excess of the light diffraction limit is reproduced, the displacement speed of the domain wall must be sufficiently higher than the linear velocity. The stable output waveform refers to a reproduced rectangular signal waveform having a sharply rising edge. Before the next recording domain starts displaying, the recording domain to be reproduced must expand to a position determined by the temperature distribution formed in the recording medium and the Curie temperature of the displacement layer (first magnetic layer 31). In other words, the domain wall needs to be moved by a maximum stroke.

The displacement speed of the domain wall is determined by a pressure caused by the temperature distribution within the reproducing light beam spot and by the dependency of the domain wall energy within the recording mark on temperature. The pressure F1 is expressed as $F1 = \partial \delta w1 / \partial x = (\partial \delta w1 / \partial T) \cdot (\partial T / \partial x)$. A larger pressure F1 results in a region where the temperature distribution formed within the reproducing light beam spot is sharper. The displacement speed of the domain wall is faster. As a sharper temperature distribution is formed within the reproducing light beam spot, the displacement speed of the domain wall becomes faster.

Figure 2:
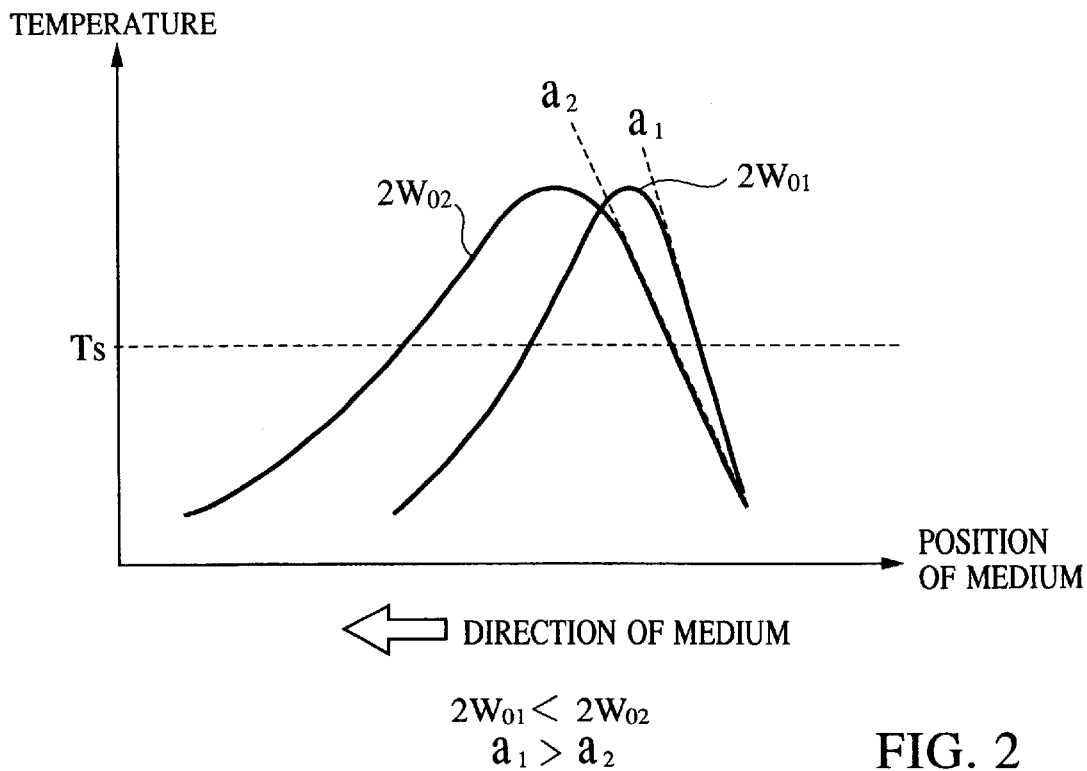
FIG. 2 illustrates a temperature distribution characteristic depending on a reproducing beam spot diameter.

When one beam DWDD reproduction is used, the temperature distribution formed in the recording medium is determined by the optical system thereof. A sharp temperature distribution and a fast displacement speed of the domain wall are achieved by miniaturizing the spot diameter 2Wo ($= K \cdot \lambda / NA$), on the medium, of the beam projected by the optical system. FIG. 2 shows, in comparison, temperature distributions on the recording medium with one-beam DWDD reproduction using reproducing light beam spots of 2Wo1 and 2Wo2 (2Wo1<2Wo2).

As can be seen from FIG. 2, the gradients of tangent lines a1 and a2 of the temperature distribution curves at temperature Ts (corresponding temperature Ts in FIG. 1(b)) of the spot diameters 2Wo1 and 2Wo2 are related to be a1>a2. A smaller spot diameter 2Wo1 provides a steeper gradient. The steeper the gradient of the tangent line, the greater the drive power acting in the displacement of the domain wall. The displacement speed of the domain wall becomes fast. With the reproducing light beam spot miniaturized, the maximum distance of travel of the domain wall, determined by the temperature distribution formed in the recording medium and the Curie temperature of the displacement layer, becomes shorter. As already discussed, along with an increase in the displacement speed of the domain wall, the rising edge of the reproduced signal is steepened. A stable DWDD reproduction is thus achieved. In this way, the rotational speed of the disk is set to be high, thereby increasing the data transfer rate.

Figure 3:
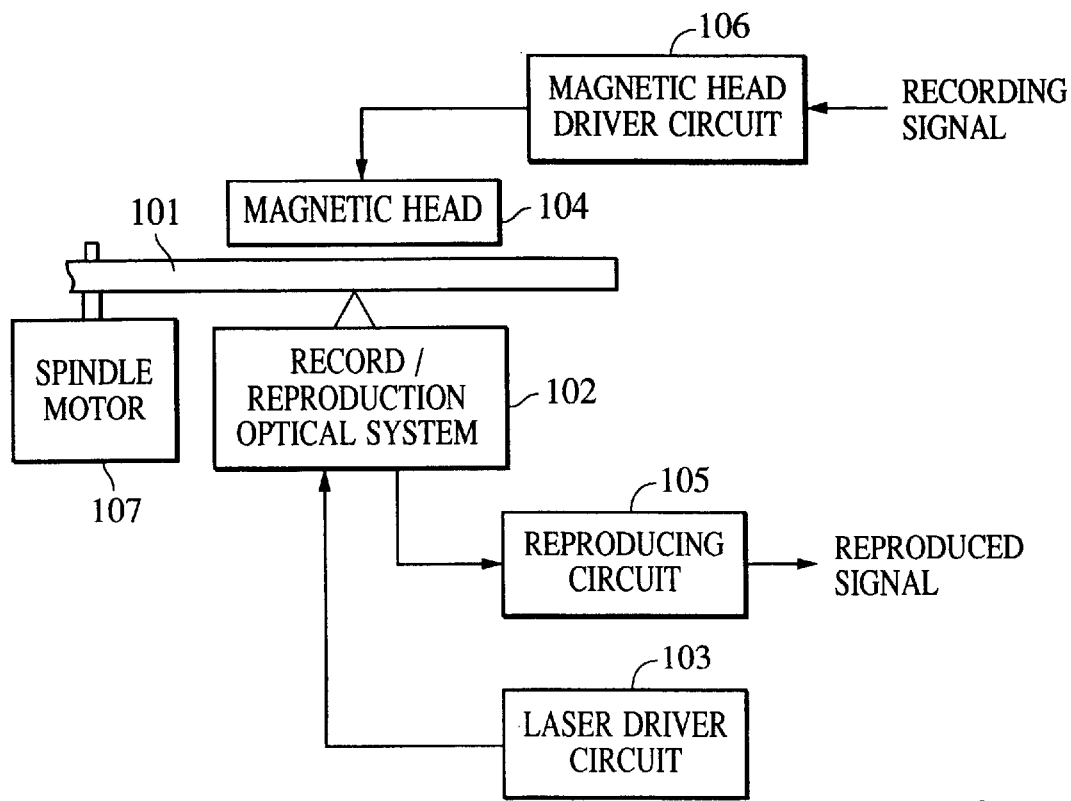
FIG. 3 illustrates one embodiment of the magnetooptical reproduction apparatus of the present invention.

FIG. 3 is a block diagram showing the construction of one embodiment of the magnetooptical reproducing apparatus of the present invention. Discussed here is a magnetic modulation which records information by modulating magnetic field intensity. The present invention is also applicable to an optical modulation which records information by modulating an optical beam intensity. Referring to FIG. 3, a magnetooptical disk 101 is a magnetooptical recording medium on which information is recorded, and from which information is reproduced, using interaction between a light beam and magnetism/magnetic domain. The recording medium is a magnetooptical disk having a disk-like configuration, and is rotatably driven by a spindle motor 107. The magnetooptical disk generally has a construction as shown in FIG. 1(a). The present invention is applicable to the DWDD reproduction method disclosed in Japanese Patent Laid-Open No. 6-290496. Successively laminated on a transparent substrate are at least first, second, and third magnetic layers which are exchange-coupled at room temperature. The first magnetic layer is fabricated of a magnetic film having a domain wall coercive force smaller than that of the third magnetic layer and a domain wall mobility higher than that of the third magnetic layer, at a temperature near ambient temperature. The first magnetic layer is a displacement layer in which a domain wall is displaceable. The third magnetic layer is a memory layer that holds a recording magnetic domain indicating information. The second magnetic layer is a switching layer which has a Curie temperature lower than that of the first magnetic layer and the third magnetic layer.

Arranged on the substrate side of the magnetooptical disk 101 is a record/reproduction optical system 102 which houses a light source and optical elements including a variety of lenses and a photodetector. The optical system 102 directs a reproducing light beam to the magnetooptical disk 101 and detects a light beam reflected from the magnetooptical disk 101. The optical system 102 houses a laser light source as a recording and reproducing light source, an objective lens for condensing the laser beam emitted from the laser light source into a miniature beam spot, and a variety of optical elements such as a photosensor for detecting the reflected light beam from the magnetooptical disk 101. As will be discussed later, the optical system 102 produces a reproducing light beam having a beam waist diameter of 2Wo satisfying a condition of 2Wo<900 nm, thereby increasing the displacement speed of the domain wall and the rotational speed of the disk. A stable DWDD reproduction thus results.

A laser driver circuit 103 is a circuit for driving the laser light source in the optical system 102, and drives the laser light source with recording power during information recording, and drives the laser light source with reproducing power during information reproducing. During recording, the laser light source is driven with a recording power so that the optical system 102 directs a recording light beam to the magnetooptical disk 101 while a magnetic head 104 applies a modulated magnetic field. The magnetic head 104 is driven by a magnetic head driver circuit 106 to modulate the magnetic field in response to information/data of a recording signal. Information recording is thus performed.

During information reproducing, the laser light source is driven with a reproducing power so that the optical system 102 directs a reproducing light beam to the magnetooptical disk 101. When the magnetooptical disk 101 is irradiated by the reproducing light beam, a domain wall of a magnetic domain is displaced as discussed with reference to FIG. 1(a). The photosensor in the optical system 102 detects the light beam reflected from an expanded magnetic domain, thereby sensing a change in the polarization. A reproducing circuit 105 reproduces a signal from the output from the photosensor, binarizes the reproduced signal, and performs predetermined signal processes such as demodulation. In this way, the recorded information is reproduced.

The inventors of this invention produced the DWDD magnetooptical reproducing apparatus, and conducted evaluation tests on the apparatus by varying the beam waist diameter of the reproducing light spot. Examples 1–3 and comparative Examples 1–4 are now discussed.

EXAMPLE 1

A transparent substrate supporting a magnetooptical medium was fabricated of polycarbonate (PC) through a injection molding technique. The substrate was a groove recording substrate having a track pitch of 1.1 $\mu$m and a groove depth of 0.15 $\mu$m. Instead of polycarbonate (PC), polymethyl methacrylate (PMMA), amorphous polyolefin (APO), or the like may be used as the composition for the substrate. Alternately, a two-plate molded substrate made from ultraviolet setting resin may be used. In this embodiment, the groove recording substrate is employed. The present invention is applicable to a land recording substrate or a land-groove recording substrate.

A recording layer was then produced on the substrate through a sputtering technique. The recording layer, which is a magnetooptical medium, was fabricated by successively laminating, on the substrate, a first dielectric layer (SiN), a first magnetic layer (GdFeCo) as thick as approximately 30 nm, a second magnetic layer (TbFe) as thick as approximately 30 nm, a third magnetic layer (TbFeCo) as thick as approximately 40 nm, and a second dielectric layer (SiN). Instead of SiN, the dielectric layer may be fabricated of another transparent dielectric material such as AlN, $SO_2$, SiO, ZnS, or $MgF_2$.

As the second magnetic layer and the third magnetic layer, a variety of magnetic materials including the above magnetic materials may be employed. For example, a rare-earth/transition-metal amorphous alloy may be employed which is made from 10–40 atomic % of one or two elements selected from rare earth elements including Pr, Nd, Sm, Gd, Tb, Dy, and Ho, and 60–90 atomic % of one or two metals selected from transition metals including Fe, Co, and Ni. To improve corrosion resistance, a slight amount of elements selected from a group consisting of Cr, Mn, Cu, Ti, Al, Si, Pt, and In may be added.

After recording a plurality of recording marks on the produced magnetooptical medium, a reproduction operation was performed by the displacement of domain walls of the recording marks, and the jitter SD of the reproduced signal was measured. The test conditions included a recording power of 5.0 mW, a laser wavelength λ of 410 nm, a numerical aperture NA of 0.55, and a rotational speed of the magnetooptical medium of 6 m/s. The laser beam was directed to the magnetooptical medium while an external magnetic field of 200 (Oe) was modulated and applied thereon. A carrier signal was written with a tone of 30 MHz recording frequency.

Figure 4A:
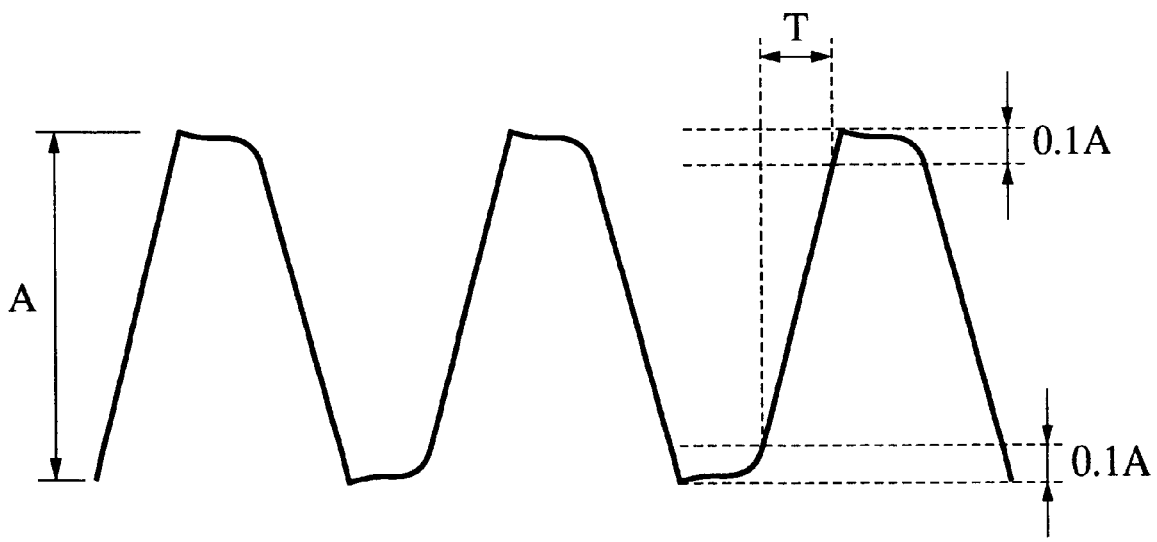
FIGS. 4A and 4B illustrate, in comparison, reproduced signal waveforms resulting from a reproducing light beam having a beam waist diameter 2Wo of less than 900 nm and a reproducing light beam having a beam waist diameter 2Wo of 900 nm or longer, respectively.

When the recorded signal was reproduced, the reproducing conditions included a reproduction power of 2.5 mW, a laser wavelength λ of 410 nm, a numerical aperture NA of 0.55, a rotational speed of the magnetooptical medium of 6 m/s, and a beam waist diameter 2Wo of a reproducing light beam spot of 610 nm. The recorded information was reproduced with the reproducing light beam spot directed to the magnetooptical medium. The jitter SD during the reproduction was 7%. FIG. 4A shows the waveform of the reproduced signal. As clearly seen from FIG. 4A, the reproduced signal has a sharply rising edge. The rising time was 5 ns. The recording power and the reproducing power were set so that the jitter of the reproduced signal showed a minimum value.

EXAMPLE 2

The test conditions remained unchanged from those in Example 1 except that the numerical aperture NA of the objective lens of the optical system during reproduction was 0.40 and that the beam waist diameter 2Wo of the reproducing light beam was 840 nm. Under these conditions, the reproducing light beam was directed to the magnetooptical medium to reproduce the recorded signal. The jitter SD of the reproduced signal was 9% and the rising time was 8 ns.

EXAMPLE 3

The test conditions remained unchanged from those in Example 1 except that the numerical aperture NA of the objective lens of the optical system during reproduction was 0.60 and that the beam waist diameter 2Wo of the reproducing light beam was 650 nm. Under these conditions, the reproducing light beam was directed to the magnetooptical medium to reproduce the recorded signal. The jitter SD of the reproduced signal was 9% and the rising time was 8 ns.

COMPARATIVE EXAMPLE 1

Figure 4B:
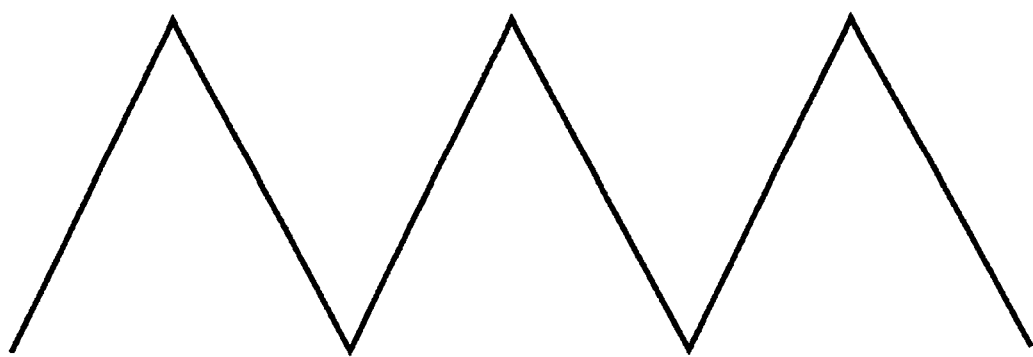

The test conditions remained unchanged from those in Example 1 except that the laser wavelength λ of the optical system during reproduction was 650 nm and that the beam waist diameter 2Wo of the reproducing light beam was 970 nm. The jitter SD of the reproduced signal was 15%. The reproduced signal was a triangular waveform as shown in FIG. 4B. To acquire a waveform when the domain wall moved by the maximum distance of travel determined by the temperature distribution formed in the medium and the Curie temperature, a tone of 15 MHz recording frequency was written on the rotary disk at a speed of 6 m/s. When the signal was reproduced, the rising time of the reproduced signal was 10 ns.

COMPARATIVE EXAMPLE 2

The test conditions remained unchanged from those of the Comparative Example 1 except that the rotational speed of the medium was 2 m/s during reproduction. The jitter SD of the reproduced signal was 11% and the rising time was 11 ns.

COMPARATIVE EXAMPLE 3

The test conditions remained unchanged from those in Example 1 except that the laser wavelength λ of the optical system during reproduction was 680 nm and that the beam waist diameter 2Wo of the reproducing light beam was 1010 nm. The jitter SD of the reproduced signal was 20%. The reproduced signal was a triangular waveform as shown in FIG. 4B. To acquire a waveform when the domain wall moved by the maximum distance of travel determined by the temperature distribution formed in the medium and the Curie temperature, a tone of 15 MHz recording frequency was written on the rotary disk at a speed of 6 m/s using the optical system of Example 1. When the signal was reproduced on the optical system of λ of 680 nm, the rising time of the reproduced signal was 12 ns.

COMPARATIVE EXAMPLE 4

The test conditions remained unchanged from those of Comparative Example 3 except that the rotational speed of the medium was 2 m/s. The jitter SD of the reproduced signal was 12% and the rising time was 13 ns.

As clearly understood from the results of Examples 1 through 3 and Comparative Examples 1 through 4, the jitter of the reproduced signal becomes smaller and the rising time of the reproduced signal becomes shorter as the beam waist diameter 2Wo of the reproducing light beam spot gets smaller. When the beam waist diameter 2Wo of the reproducing light beam spot gets smaller than 900 nm, the jitter of the reproduced signal drops below 10%.

From Comparative Examples 1 through 4, even if the beam waist diameter 2Wo of the reproducing light beam spot is larger than 900 nm, a stable DWDD reproduction is accomplished by slowing the rotational speed of the medium to 2 m/s. From Examples 1 through 3, when the beam waist diameter 2Wo of the reproducing light beam spot is smaller than 900 nm, a reproduced signal having a small jitter and a fast rising edge results even if the medium rotational speed is increased to 5 m/s or higher. A stable DWDD reproduction operation is thus accomplished, permitting a fast data transfer rate.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A magnetooptical reproducing apparatus for reproducing information recorded on a magnetooptical recording medium by detecting movement of a domain wall of a recording domain of the magnetooptical recording medium caused to move in accordance with a temperature distribution formed in the magnetooptical recording medium, the magnetooptical reproducing apparatus comprising:

an optical system that directs an optical beam to the magnetooptical recording medium to form a temperature distribution in the magnetooptical recording medium, the optical system satisfying a condition of 2Wo<900 nm, where 2Wo is a beam waist diameter of the optical beam;

a drive mechanism that moves the optical beam and the recording medium relative to one another; and a signal reproducing circuit that generates a reproduction signal in response to detected variations in the optical beam reflected from the magnetooptical recording medium.

2. A magnetooptical reproducing apparatus according to claim 1, further comprising a second optical system that detects the optical beam reflected from the magnetooptical recording medium.

3. A magnetooptical reproducing apparatus according to claim 1, wherein the drive mechanism is a spindle motor.

4. A magnetooptical reproducing apparatus according to claim 3, wherein the rotational speed of the spindle motor is not less than 5 m/s.

5. A magnetooptical reproducing apparatus according to claim 1, wherein the magnetooptical recording medium comprises a first magnetic layer, a second magnetic layer, and a third magnetic layer successively laminated in that order, wherein the first magnetic layer is fabricated of a magnetic film having a domain wall coercive force smaller than that of the third magnetic layer and a domain wall mobility higher than that of the third magnetic layer, at a temperature near ambient temperature, and wherein the second magnetic layer is fabricated of a magnetic film having a Curie temperature higher than that of the first magnetic layer and the third magnetic layer.

6. A magnetooptical reproducing method for reproducing information recorded on a magnetooptical recording medium by detecting movement of a domain wall of a recording domain of the magnetooptical recording medium caused to move in accordance with a temperature distribution formed in the magnetooptical recording medium, the magnetooptical reproducing method comprising:

directing an optical beam to the magnetooptical recording medium to form a temperature distribution in the magnetooptical recording medium, wherein the optical system satisfies a condition of $2W_o<900$ nm, where $W_o$ is a beam waist diameter of the optical beam;

moving the optical beam and the magnetooptical recording medium relative to one another;

detecting the optical beam reflected from the magnetooptical recording medium; and generating a reproduction signal in response to the result of said detecting step corresponding to data recorded on the magnetooptical recording medium.

* * * * *

UNITED STATES PATENT AND TRADEMARK OFFICE
CERTIFICATE OF CORRECTION

PATENT NO. : 6,608,799 B2
DATED : April 19, 2003
INVENTOR(S) : Yasushi Hozumi

It is certified that error appears in the above-identified patent and that said Letters Patent is hereby corrected as shown below:

Column 1,
Line 54, "at" should read -- as --.

Column 3,
Line 47, "bw1" should read -- δw1 --.
Line 60, "equation." should read -- equation: --.

Column 6,
Line 30, "a" should read -- an --.

Signed and Sealed this

First Day of June, 2004

JON W. DUDAS
*Acting Director of the United States Patent and Trademark Office*